United States Patent [19]

Shupe

[11] 4,088,189

[45] May 9, 1978

[54] SURFACTANT OIL RECOVERY PROCESS USABLE IN HIGH TEMPERATURE FORMATIONS CONTAINING HIGH SALINITY WATER

[75] Inventor: Russell D. Shupe, Houston, Tex.

[73] Assignee: Texaco Inc., New York, N.Y.

[21] Appl. No.: 746,647

[22] Filed: Dec. 1, 1976

Related U.S. Application Data

[63] Continuation-in-part of Ser. No. 526,780, Nov. 25, 1974, Pat. No. 4,018,278.

[51] Int. Cl.$^2$ .................. E21B 43/22; E21B 43/24
[52] U.S. Cl. ................... 166/272; 166/252; 166/273; 166/275
[58] Field of Search ............ 166/252, 272, 273, 274, 166/275, 305 R, 303; 252/8.59 D

[56] References Cited

U.S. PATENT DOCUMENTS

| | | | |
|---|---|---|---|
| 3,204,694 | 9/1965 | Johnson, Jr. et al. | 166/272 X |
| 3,508,612 | 4/1970 | Reisberg et al. | 166/274 |
| 3,540,532 | 11/1970 | Davis, Jr. et al. | 166/252 |
| 3,811,504 | 5/1974 | Flournoy et al. | 166/273 |
| 3,811,505 | 5/1974 | Flournoy et al. | 166/273 X |
| 3,811,507 | 5/1974 | Flournoy et al. | 166/273 X |
| 3,827,497 | 8/1974 | Dycus et al. | 166/275 X |
| 3,890,239 | 6/1975 | Dycus et al. | 166/275 X |
| 3,977,471 | 8/1976 | Gale et al. | 166/275 X |
| 4,016,932 | 4/1977 | Kalfoglou | 166/272 X |
| 4,018,278 | 4/1977 | Shupe | 166/274 X |

Primary Examiner—Stephen J. Novosad
Assistant Examiner—George A. Suchfield
Attorney, Agent, or Firm—Carl G. Ries; Thomas H. Whaley; Jack H. Park

[57] ABSTRACT

Many petroleum-containing formations contain high salinity and/or hard water and have temperatures from 150° F to 300° F. Many surfactants known for oil recovery purposes may be used in either the high salinity or hard water, or in the presence of high temperature, but few surfactants or surfactant combinations are suitable for use in formations containing both high salinity water and temperatures much in excess of about 150° F. An alkylpolyalkoxyalkyl sulfonate or alkylarylpolyalkoxyalkyl sulfonate, either as the sole constituent of an aqueous surfactant fluid, or as a solubilizing co-surfactant in combination with an anionic surfactant such as petroleum sulfonate, an alkyl sulfonate, or an alkylaryl sulfonate, is effective for use in formations containing high salinity and/or hard water which are additionally at a temperature from about 70°–300° F. The chain length of the alkyl constituent of the alkylpolyalkoxyalkyl sulfonate or alkylarylpolyalkoxyalkyl sulfonate, as well as the number of alkoxy groups in the surfactant molecule is carefully chosen to achieve limited solubility in a solution having salinity and divalent ion concentration about equal to the formation water at a temperature about equal to the formation temperature. Such solutions are not phase stable at surface ambient temperature if the difference between the formation temperature and the surface ambient temperature is substantially greater than about 100° F. It is necessary to heat the solution to completely dissolve the surfactants therein and to maintain the solution heated to a temperature within at least 100° F of the formation temperature and preferably within at least 50° F of the formation temperature when it is injected thereinto.

35 Claims, No Drawings

SURFACTANT OIL RECOVERY PROCESS USABLE IN HIGH TEMPERATURE FORMATIONS CONTAINING HIGH SALINITY WATER

CROSS REFERENCE TO RELATED APPLICATION

This application is a continuation-in-part of copending application Ser. No. 526,780 filed Nov. 25, 1974, now U.S. Pat. No. 4,018,278 for Surfactant Oil Recovery Process For High Temperature Formations.

BACKGROUND OF THE INVENTION

1. Field of the Invention

This invention concerns an oil recovery process, and more specifically is concerned with a surfactant oil recovery process. Still more specifically, this invention is concerned with an oil recovery process using a surfactant or a combination of surfactants which is operable for surfactant flooding purposes in formations whose temperature are from 70°-300° F and which formations contain high salinity and/or high divalent ion concentrations of water, and a method of formulating and injecting the fluid so as to avoid phase instability.

2. Description of the Prior Art

Petroleum is normally recovered from subterranean formations in which it has accumulated by penetrating the formation with one or more wells and pumping or permitting the petroleum to flow to the surface through these wells. Recovery of petroleum from formations is possible only if there is an adequate concentration of petroleum in the formation and if there is sufficient permeability or interconnected flow channels in the formation to permit the flow of fluids therethrough if sufficient pressure is applied to the fluids. When the formation has natural energy present therein in the form of an underlying active water drive, or gas dissolved in the petroleum which can exert pressure to drive the petroleum to the producing well, or a high pressure gas cap above the petroleum within the formation, this natural energy may be utilized to recover petroleum. Recovery by utilization of natural energy is referred to as primary recovery. When this natural energy source is depleted or in the instances of formations which do not contain sufficient natural energy initially to support primary recovery, some form of supplemental or enhanced recovery process must be applied to the formation in order to extract additional petroleum therefrom. Supplemental recovery is sometimes referred to in the art as secondary or tertiary recovery, although in fact it may be primary, secondary or tertiary in sequence of employment.

Waterflooding, involving the injection of water into the subterranean, petroliferous formation for the purpose of displacing petroleum toward the producing well, is the most economical and widely practiced supplemental recovery method. Water does not displace petroleum efficiently, since water and oil are immiscible and the interfacial tension between water and oil is quite high. Persons skilled in the art of oil recovery have recognized this weakness of waterflooding and many additives have been described in the literature for decreasing the interfacial tension between the injection water and the formation petroleum. The use of petroleum sulfonates in oil recovery processes is described in many prior art references including U.S. Pat. No. 3,302,703.

Many prior art references also disclose the use of combinations of surfactants for use in formations containing water having high salinities and/or high concentrations of divalent ions. Included in these are U.S. Pat. Nos. 3,792,731; 3,811,504; 3,811,505; and 3,811,507, which describe mixtures of anionic and nonionic surfactants especially useful in formations containing water of high salinity or having high concentrations of divalent ions including calcium and magnesium dissolved therein. U.S. Pat. No. 3,508,612 describes an oil recovery process using a mixture of an organic sulfonate such as a petroleum sulfonate and a sulfated, polyalkoxylated (especially ethoxylated) hydrocarbon for use in high salinity formations. U.S. Pat. Nos. 3,827,497 and 3,890,329 describe oil recovery fluids and processes employing a mixture of an organic sulfonate such as a petroleum sulfonate and a sulfonated, ethoxylated hydrocarbon surfactant. U.S. Pat. No. 3,977,497 describes an oil recovery process employing an alkylarylpolyalkoxyalkyl sulfonate as the sole surfactant in a fluid for recovering petroleum from high salinity, high temperature formations.

Despite the substantial amount of art discussed above dealing with the use of surfactant fluids for oil recovery purposes, a commercially viable surfactant flooding oil recovery process suitable for use in high temperature, high salinity formations has not yet been developed. Oil recovery processes employing the alkylpolyalkoxyalkyl sulfonates or alkylarylpolyalkoxyalkyl sulfonates such as an alkylpolyethoxyethyl sulfonate or an alkylarylpolyethoxyethyl sulfonate show great promise because these materials are both temperature stable and adaptable to high salinity, high divalent ion containing formation waters. An aqueous solution of some of these surfactants have, however, been found to exhibit phase instability and injection of a phase-unstable surfactant solution into a formation is at best ineffective for oil recovery purposes and is potentially hazardous because of the possibility of plugging small capillary flow channels of the formation with insoluble organic material.

In view of the foregoing discussion, it can be appreciated there is a substantial present economic and commercial need for a surfactant flooding oil recovery process suitable for use in high temperature, high salinity water-containing oil formations.

SUMMARY OF THE INVENTION

I have discovered an oil recovery process employing a surfactant having the following general structure

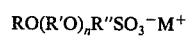

$$RO(R'O)_nR''SO_3^-M^+$$

in which

R is an alkyl radical, branched or linear, or an alkylaryl radical such as an alkylbenzene, alkyltoluene or alkylxylene group, having from 8 to 24 carbon atom in the alkyl chain;

R' is ethyl or a mixture of ethyl and propyl with relatively more ethyl than propyl;

R'' is ethyl, propyl, hydroxypropyl or butyl;

n is an integer from 1-20 and preferably from 2-8; and

M+ is a monovalent cation such as ammonium, sodium, lithium or potassium.

The above noted alkoxylated sulfonate surfactant may be utilized as the sole constituent in an aqueous fluid for use in oil recovery operations, or it may be used in combination with anionic surfactants, usually organic sulfonates such as a petroleum sulfonate, an alkyl sulfonate, an alkylaryl sulfonate, and other hydrocarbon based sulfonates. In a slightly different embodiment, the above noted alkoxylated surfactant may be utilized in combination with a water insoluble nonionic surfactant such as an ethylene oxide adduct of an alkanol or of an alkylphenol for the purpose of achieving improved phase stability.

The principle variable parameters of the alkoxylated sulfonate surfactant are the chain length of the first R group, and the number of ethylene oxide or mixed ethylene oxide and propylene oxide groups per molecule. Increasing the chain length of the alkyl or alkylaryl group R increases the oil solubility of the surfactant and increasing the number of ethylene oxide groups increases the water solubility of the surfactant. Optimum results are achieved when the surfactant has precisely the right balance between the oil soluble and water soluble groups, and this balance must be determined in precisely the same solution environment as it will be present in the oil containing formation. This means that the measurements to be discussed below must be made in a fluid having as nearly as possible the same sodium chloride or other salt content and the same divalent ion concentration as the formation brine in the formation into which the surfactant is to be injected for oil recovery purposes. Whether the surfactant is utilized as the sole surfactant in the fluid injected for oil recovery, or in combination with a water insoluble ethoxylated aliphatic alcohol or ethoxylated alkylphenol phase-stabilizing agent or in combination with a hydrocarbon based sulfonate such as a petroleum sulfonate, the effectiveness of the surfactant or surfactants must be determined in an aqueous solution having about the same salinity and divalent ion concentration as the formation water and the effectiveness must be determined at formation temperature. When this optimum balance of the alkoxylated sulfonate surfactant is found, the surfactant is insoluble in the formation brine at surface ambient conditions if the difference between formation temperature and surface ambient temperature is substantially greater than about 100° F (37.8° C).

In order to completely disperse the optimum alkylpolyalkoxyalkyl sulfonate or alkylarylpolyalkoxyalkyl sulfonate surfactant in the desired saline solution, it is necessary to heat the solution to a temperature which is within at least 100° F of the formation temperature and which is preferably within at least 50° F of the formation temperature. Furthermore, after the heated solution is prepared, its temperature should be maintained at this temperature of at least 100° F below and preferably 50° F below the formation temperature until it is injected into the formation, in order to avoid phase instability which can result when using certain surfactants or combinations of surfactants. If a phase unstable fluid were injected into an oil formation, very little oil recovery would be obtained and plugging of the flow channels could occur resulting in severe loss of injectivity, which would temporarily preclude further oil recovery from that portion of the formation.

DESCRIPTION OF THE PREFERRED EMBODIMENTS

My invention concerns a surfactant flooding oil recovery process which will in all of its embodiments employ a fluid containing a surfactant having the following general formula $$RO(R'O)_nR''SO_3^-M^+$$

in which
R is an alkyl radical such as a branched or linear alkyl group, or an alkylaryl radical such as an alkylbenzene, alkyltoluene or alkylxylene having from 8 to 24 carbon atoms in the alkyl chain;
R' is ethyl or a mixture of ethyl and propyl with relatively more ethyl than propyl;
R'' is ethyl, propyl, hydroxypropyl or butyl;
$n$ is an integer from 1–20 and preferably from 2–8; and
M$^+$ is a monovalent cation such as ammonium, sodium, lithium or potassium.

In certain embodiments, the above described alkoxylated sulfonate surfactant will be employed as essentially the only surface active agent in the aqueous fluid injected into the formation to displace petroleum. In another embodiment, a water insoluble nonionic surfactant, usually an ethoxylated aliphatic alcohol or ethoxylated alkylphenol may be employed in combination therewith as needed to impart phase stability to the fluid at formation conditions. The water insoluble nonionic surfactant will have the following general formula $$RO(R'O)_nH$$

in which R, R' and $n$ have essentially the same meaning as above. Water soluble nonionic surfactants have been proposed for surfactant flooding purposes in the literature, but the type of surfactant which I disclosed above for use in combination with the alkoxylated sulfonate is different from those which have been proposed in the prior art, principally in that the balance between the oil soluble or hydrophobic group (R in the above formula), and the water soluble group (R'O in the above formula), which is ordinarily ethylene oxide, is slightly different. The water insoluble nonionic surfactants differ from the water soluble nonionic surfactants only in that the water insoluble nonionic surfactants have relatively fewer ethylene oxide groups than would a water soluble nonionic surfactant with the same oil soluble group.

In another embodiment, the above described alkoxylated sulfonate surfactant is used as a solublizing co-surfactant in combination with an organic sulfonate such as a petroleum sulfonate, an alkyl sulfonate, an alkylaryl sulfonate, etc. A petroleum sulfonate is a particularly desirable surfactant for use in an oil recovery process because it is comparatively inexpensive and quite effective when paired with an alkylpolyalkoxyalkyl sulfonate or alkylarylpolyalkoxyalkyl sulfonate solubilizing co-surfactant.

The choice between the above embodiments is to a large extent determined by the salinity of the formation water and the formation temperature. Trial and error testing is necessary to determine precisely which embodiment is most suitable for a particular application. The above embodiments are effective over a broad salinity and temperature range. The embodiment employing an alkoxyalkyl sulfonate and water insoluble nonionic are especially preferred for use in high temperature environments since certain combinations thereof exhibit viscosity sufficient to ensure efficient displacement, even at high temperatures where hydrophilic polymers cannot be used to develop viscosity because of their high temperature limitations.

I have discovered that in any of the above embodiments, for a formation whose temperature in degrees Fahrenheit is T, the surfactant fluid should be formulated and injected at a temperature between $(T-100)°$ F and $T°$ F or above and preferably from $(T-50)°$ F to $T°$ F or above.

In instances of very high formation temperatures, e.g., over 225° F, it may be impractical to heat the surfactant fluid to a temperature over about 160° F to 175° F, and this is satisfactory.

Ordinarily, in application of this process to a subterranean petroleum-containing formation, no preflush will be required for the purpose of reducing the salinity of the formation water since the surfactant will have been carefully selected to operate at an optimum level at the salinity and hardness of the formation water and at formation temperatures. Field water containing about the same salinity and divalent ion concentrations may be injected in advance of the surfactant fluid for the purpose of pretreating the formation to accomplish other objectives, however, such as the injection of sacrificial agents which are absorbed by the formation matrix and as a consequence thereof reduce the amount of surfactant absorbed from subsequently injected surfactant solutions.

Ordinarily, from about 0.05 to about 2.0 pore volumes and preferably from 0.1 to 0.5 pore volumes of the aqueous surfactant-containing fluid will be injected into a formation. The volume is based on the pore volume of the portion of the formation which will be contacted by the injected surfactant fluid, which is determinable by petroleum engineering methods that are well known in the art of oil recovery.

The concentration of the alkoxylated sulfonate described above will ordinarily be from about 0.10 to about 10.0 percent and preferably in the range of from about 0.5 to about 5.0 percent by weight. If the water-insoluble nonionic alkoxylated surfactant is utilized as a phase stabilizing agent, its concentration will ordinarily be from about 20 to about 60 percent of the concentration of the alkoxylated sulfonate surfactant. In the embodiment employing an organic sulfonate such as a petroleum sulfonate in combination with the alkoxylated surfactant as a solubilizing co-surfactant, the concentration of the organic sulfonate will ordinarily be in the range from about 0.1 to about 10.0 percent by weight and preferably in the range of from about 0.5 to about 5.0 percent by weight with the alkoxylated sulfonate surfactant concentration in this embodiment being from about 0.1 to about 5.0 percent by weight and preferably from 0.25 to 2.5 percent by weight.

The aqueous surfactant fluid, which may be a micellar dispersion or a water external emulsion, may contain other additives if needed to accomplish specific purposes. For example, materials may be incorporated in the surfactant fluid to further decrease the tendency for the surfactant to be absorbed by the formation matrix from the surfactant solution. Lignosulfonates are frequently employed for this purpose. Hydrophilic, viscosity-increasing polymeric materials such as polyacrylamides, partially hydrolyzed polyacrylamides, or polysaccharides in an amount from about 100 to 1,500 parts per million may also be incorporated in the surfactant fluid to increase the surfactant fluid viscosity to a value equal to or preferably slightly greater than the viscosity of the formation petroleum in order to ensure better volumetric displacement of the formation petroleum, if the temperature of the formation is within the stability limits of the polymer and if no surfactant-polymer interaction is observed.

In the present state of the art of surfactant oil recovery processes, it is also common practice to inject a viscous aqueous fluid immediately after the surfactant fluid is injected into the formation, to ensure that the surfactant fluid is efficiently displaced by the subsequently injected drive fluid. Water containing hydrophilic polymers such as polyacrylamides, partially hydrolyzed polyacrylamides, polysaccharides, etc., in a concentration of from about 100 to about 1,500 parts per million is frequently employed for this purpose, and may be employed in this process subject to the above limitations. The concentration of polymer may be tapered or decreased with time as the polymer-containing fluid is injected into the formation, to provide a smooth transition between the viscous mobility buffer and the drive fluid to be injected next in the process. Ordinarily, the mobility buffer or viscous fluid is followed by field water to displace all of the previously injected fluids as well as the oil mobilized by the surfactant fluid through the formation to the production well, from which it may be recovered to the surface of the earth.

There are several methods suitable for use in preparing the desired alkoxylated sulfonate surfactant. A polyethoxylated alkylphenol, a commonly available nonionic surfactant, may be reacted with thionyl chloride $SOCl_2$ to replace the terminal hydroxyl group with a chlorine, which is then reacted with sodium sulfite to form the desired alkylarylpolyethoxyethyl sulfonate as is shown below.

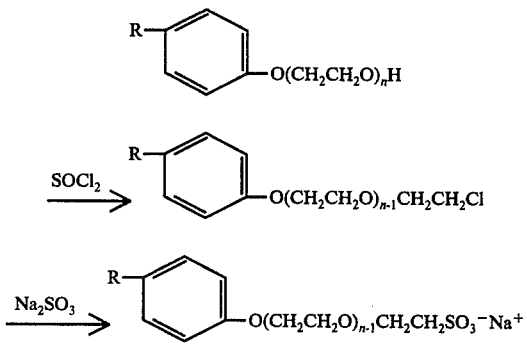

It can be seen from the foregoing that the method whereby the surfactant is synthesized is the principal determinant of the linking group R″ between the terminal alkoxy group and the sulfonate radical. Similarly useful materials may be prepared from ethylene oxide adducts of aliphatic alcohols or alkylphenols employing propane sultones which will result in forming an alkylpolyethoxypropane sulfonate or an alkylarylpolyethoxypropane sulfonate, which performs in a similar manner to the corresponding ethyl sulfonate prepared by the first synthesis method. Still other synthesis methods result in forming alkoxylated sulfonates in which the linking group R″ is a hydroxypropane or a butane group.

The foregoing discussion of methods for synthesizing the compound for use in the process of my invention are provided for background information and illustrate how the linking group R″ is ordinarily determined by the synthesis route. Whether the linking group R″ is $C_2$, $C_3$, $C_3(OH)$, or $C_4$ does not substantially effect the performance of the material in the process of my invention. Of greater importance is the length of the alkyl chain R, which affects the oil solubility of the surfactant, and the number of ethoxy groups present in the molecule.

In applying the process of my invention to any particular oil reservoir, it is preferable to obtain a sample of water present in the formation, and either analyze it and prepare a synthetic brine having essentially the same salinity and divalent ion concentration as the formation water, or use a sample of the actual formation water in the test to be described below. It is also essential that the temperature of the formation be known or determined, and that the tests be performed at that temperature.

The laboratory tests by means of which the best alkylpolyalkoxyalkyl sulfonate or alkylarylpolyalkoxyalkyl sulfonate for use in applying my process to a particular formation can be identified may involve actual oil displacement tests utilizing a core from the oil bearing formation, or other tests from which it can be inferred whether low interfacial tension can be achieved utilizing a particular surfactant solution. The most commonly accepted test for this purpose is a direct measurement of interfacial tension, by methods which are well known in the art of oil recovery. It is essential, however, that the interfacial tension measurements be made at or near the actual formation temperature, since changes in temperature will effect the solubility and activity of the surfactant materials present in the aqueous fluid and therefore will affect the values of interfacial tension obtained. Ordinarily, it is essential that the interfacial tension be less than about $1 \times 10^{-2}$ dynes per centimeter and preferably less than $5 \times 10^{-3}$ dynes per centimeter in order for the surfactant fluid to be capable of efficient low tension displacement of petroleum.

If the alkylpolyalkoxyalkyl sulfonate or alkylarylpolyalkoxyalkyl sulfonate is to be utilized in a single surfactant mode, samples of varying alkyl chain lengths with varying numbers of ethylene oxide units per molecule should be obtained and examined to determine which specific material achieves the lowest interfacial tension in the particular salinity environment in which they must operate, at or near the temperature of the formation. As a general guideline for use in obtaining an effective starting point, if the salinity is around 200,000 parts per million total dissolved solids, and the divalent ion concentration is in the neighborhood of about 10,000 parts per million, and the formation temperature is around 200° F (93.3° C), an effective alkylpolyalkoxyalkyl sulfonate for use as a single surfactant is one in which R is a mixture of linear $C_{16}$ to $C_{20}$ alkyl groups and the molecule contains an average of five ethoxy groups per molecule of surfactant, and R" is $C_2H_4$. This should be effective at a concentration of about 1 percent by weight. Laboratory tests should be performed at a temperature of 200° F. Alternatively, a dodecylbenzenehexaethoxyethyl sulfonate, preferably the sodium or ammonium salt, will be effective in this same region. If the salinity is about 150,000 parts per million, the initial tests should be made using similar compounds with about 2 fewer moles of ethylene oxide per mole of surfactant. Similarly, if the temperature is about 50° less, materials having about 2 more moles of ethylene oxide per mole of surfactant should be examined. These guidelines may be extrapolated or interpolated, but only for the purpose of choosing materials for experimentation, as the optimum compound should be identified in laboratory tests utilizing several species differing in the number of ethoxy groups, and in the number of carbon atoms in the alkyl chain.

If it is desired to incorporate a water insoluble nonionic surfactant such as an ethoxylated alkanol or ethoxylated alkylphenol for the purpose of improving the phase stability of the fluid at formation temperatures, a suggested starting point for the laboratory tests will involve using a polyethoxylated alkylphenol having about the same number of carbon atoms in the ethoxy chain and from the same to about 2 less ethoxy groups per molecule as the ethoxy sulfonate surfactant contains. The concentration of the water insoluble nonionic surfactant should be from about 20 percent to about 60 percent of the concentration of the ethoxy sulfonate surfactant.

If it is desired to incorporate a hydrocarbon sulfonate such as petroleum sulfonate in the surfactant fluid, it is recommended that initial laboratory tests be performed utilizing a material having an average equivalent weight in the range from about 325 to about 450. The same ethoxy sulfonate compound mentioned above may be utilized in combination with petroleum sulfonates for a salinity value of about 200,000 parts per million total dissolved solids and 200° F. The concentration of the petroleum sulfonate should be in the range of from about 0.5 percent to about 5.0 percent by weight and the concentration of the ethoxy sulfonate should be at least 0.75 percent, for the initial test.

Based on the above starting points, laboratory tests should be conducted in which the following factors are varied consecutively, holding the other factors constant in order to identify the optimum value for each variable parameter. The parameters include the length of the alkyl chain R in the above noted formula of the alkylpolyalkoxyalkyl sulfonate or alkylarylpolyalkoxyalkyl sulfonate, the nature and number of alkoxy groups per molecule of alkoxyalkyl sulfonate, the concentration of the alkoxyalkyl sulfonate, and where applicable, the concentration of petroleum sulfonate or water insoluble nonionic surfactant. The combination of these parameters which results in the lowest interfacial should represent the particular surfactant system which will most efficiently reduce interfacial tension in the formation at the conditions existing in the formation when the surfactant solution is injected into the formation.

FIELD EXAMPLE

For the purpose of illustrating the means for applying the process of my invention, the following field example is offered. It is not meant, however, to be limitative or restrictive of the process of my invention, but is only submitted for the purpose of additional disclosure.

A subterranean, petroleum-containing formation, which is a candidate for surfactant flooding, is found to have a temperature of 240° F. and to contain water having a salinity of 210,000 parts per million totoal dissolved solids including 10,000 parts per million calcium and magnesium. Samples of the formation water are obtained and tested in the laboratory for surfactant flooding.

A series of three (linear) $C_{16-20}$ alkylpolyethoxyethyl sulfonate surfactants having 4, 5 and 6 moles of ethylene oxide per mole of surfactant are obtained and evaluated for a single surfactant application. Samples containing 1.0 percent by weight of each surfactant are prepared and the interfacial tension measurements are obtained at a temperature of 240° F.

The results are given in the Table below.

TABLE I

| Surfactant* | Conc.% | Interfacial Tension dynes/cm. |
|---|---|---|
| Tetraethoxy | 1.0 | ** |
| Pentaethoxy | 1.0 | $5 \times 10^{-3}$ |
| Hexaethoxy | 1.0 | $1 \times 10^{-2}$ |

*In all tests, the surfactant tested is a (linear) $C_{16-20}$ alkylpolyethoxyethyl sulfonate, sodium salt.
**Not soluble.

It can be seen from the foregoing example that the minimum interfacial tension in this example is obtained utilizing 1 percent by weight of the sodium (linear) $C_{16-20}$ alkylpentaethoxyethyl sulfonate which resulted in an interfacial tension measurement of $5 \times 10^{-3}$ dynes per centimeter. The surfactant solution exhibited a slight tendency to phase instability, however, detected visually by the occurrence of a cloudy gel-like layer of material near the top of the solution when the fluid was aged at 240° F for a period of 7 days. The material exhibited rapid phase separation at ambient temperatures.

It was determined that 0.3 percent of a 5 mole ethylene oxide adduct of linear $C_{16-20}$ alcohol, which is insoluble in fresh water or the formation brine at ambient temperature as well as at 240°, accomplished phase stabilization of the above noted fluid at 240° F.

Having determined that an optimum surfactant fluid contains (linear) $C_{16-20}$ alkylpentaethoxyethyl sulfonate and the 5 mole ethylene oxide adduct of linear $C_{16-20}$ alcohol, the optimum concentration value is identified by preparing samples of these materials in the same ratio with a total surfactant concentration being varied from 0.5 to 3 percent. Interfacial tension measurements are again made and it is determined that a minimum interfacial tension value of $3 \times 10^{-3}$ dynes per centimeter is obtained using a fluid containing 1.3 percent by weight sodium (linear) $C_{16-20}$ alkylpentaethoxyethyl sulfonate and 0.4 percent by weight of a 5 mole ethylene oxide adduct of linear $C_{16-20}$ alcohol.

In application of the above described surfactant fluid to the subterranean formation, it is necessary to heat the field brine having a salinity of 210,000 parts per million total dissolved solids to a temperature of at least 140° F and preferably at least 175° F to accomplish dissolution of the surfactants in the brine and ensure that a phase stable solution is obtained. In practice, the fluid is heated to a temperature of 175° F. and injected into the formation at this temperature to ensure no phase separation occurs during the injection process, and to minimize thermal shock as the fluid enters the formation whose temperature is 240° F. No injection problems are encountered so long as the temperature is maintained at a value of 175° F.

While my invention has been described in terms of a number of illustrative embodiments, it is not so limited since many variations thereof will be apparent to persons skilled in the art of surfactant flooding enhanced oil recovery without departing from the true spirit and scope of my invention. Similarly, while mechanisms have been discussed to explain the results obtained in application of the process of my invention, it is not my desire to be bound by any particular theory of operation and so it is not necessarily hereby represented that these are the only or even the most significant explanations for the phenomena involved in application of the process of my invention. It is my desire and intention to be bound and restricted only by those limitations and restrictions as appear in the claims appended immediately hereinafter below.

I claim:

1. A method for recovering petroleum from a subterranean, permeable, petroleum-containing formation penetrated by at least one injection well and by at least one production well, both wells being in fluid communication with the formation, said formation temperature being from about 70° F. to about 300° F., said petroleum formation also containing water whose salinity is from about 70,000 parts per million to about 220,000 parts per million total dissolved solids, comprising:

(a) injecting an aqueous, saline surfactant fluid into the formation via the injection well, said fluid containing a surfactant having the following formula:

$$RO(R'O)_nR''SO_3^-M^+$$

in which R is an alkyl or alkylaryl radical having from 8 to 24 carbon atoms, R' is ethyl or a mixture of ethyl and propyl with relatively more ethyl than propyl, R" is ethyl, propyl, hydroxypropyl or butyl, $n$ is a number from 1 to 20, and $M^+$ is a monovalent cation, wherein the number of carbon atoms in the alkyl chain and the number of ethylene oxide units are balanced to achieve the minimum interfacial tension at about the same salinity as the formation water and at a temperature about equal to the formation temperature, said surfactant fluid being injected at a temperature in degrees F which is at least equal to a value which is 100° less than the formation temperature in degrees F, said fluid displacing petroleum through the formation toward the production well; and (b) recovering petroleum from the formation via the production well.

2. A method as recited in claim 1 wherein the surfactant fluid is injected at a temperature which is at least equal to a value which is 50° F less than the formation temperature in degrees F.

3. A method as recited in claim 1 wherein the surfactant is an alkylphenolpolyalkoxyalkyl sulfonate.

4. A method as recited in claim 1 wherein the surfactant is an alkylarylpolyethoxyalkyl sulfonate.

5. A method as recited in claim 4 wherein the surfactant is an alkylarylpolyethoxyethyl sulfonate.

6. A method as recited in claim 4 wherein the surfactant is an alkylarylpolyethoxyhydroxypropyl sulfonate.

7. A method as recited in claim 4 wherein the surfactant is an alkylarylpolyethoxypropyl sulfonate.

8. A method as recited in claim 4 wherein the surfactant is an alkylarylpolyethoxybutyl sulfonate.

9. A method as recited in claim 1 wherein the surfactant is an alkylpolyalkoxyalkyl sulfonate.

10. A method as recited in claim 9 wherein the surfactant is an alkylpolyethoxyalkyl sulfonate.

11. A method as recited in claim 10 wherein the surfactant is an alkylypolythoxyethyl sulfonate.

12. A method as recited in claim 9 wherein the surfactant is an alkylpolyethoxypropyl sulfonate.

13. A method as recited in claim 9 wherein the surfactant is an alkylpolyethoxyhydroxypropyl sulfonate.

14. A method as recited in claim 9 wherein the surfactant is an alkylpolyethoxybutyl sulfonate.

15. A method as recited in claim 1 wherein the surfactant fluid also contains a water insoluble nonionic surfactant selected from the group consisting of polyethoxylated aliphatic alcohols and polyethoxylated alkylphenols.

16. A method as recited in claim 1 wherein the surfactant fluid also contains an organic sulfonate.

17. A method as recited in claim 16 wherein the organic sulfonate is petroleum sulfonate.

18. A method for recovering petroleum from a subterranean, permeable, petroleum-containing formation penetrated by at least one injection well and by at least one production well, both wells being in fluid communication with the formation, said formation temperature being from about 70° F. to about 300° F., said petroleum formation also containing water whose salinity is from about 70,000 parts per million to about 220,000 parts per million total dissolved solids, comprising:

(a) injecting an aqueous, saline surfactant fluid into the formation via the injection well, said fluid containing a first surfactant having the following formula:

$$RO(R'O)_nR''SO_3^-M^+$$

in which R is an alkyl or alkylaryl radical having from 8 to 24 carbon atoms, R' is ethyl or a mixture of ethyl and propyl with relatively more ethyl than propyl, R'' is ethyl, propyl, hydroxypropyl or butyl, $n$ is an number from 1 to 20, and $M^+$ is a monovalent cation, and a second surfactant which is a water insoluble nonionic surfactant selected from the group consisting of polyethoxylated aliphatic alcohols and polyethoxylated alkylphenols, said surfactant fluid being injected at a temperature in degrees F which is at least equal to a value which is 100° less than the formation temperature in degrees F, said surfactant fluid displacing petroleum through the formation toward the production well; and (b) recovering petroleum from the formation via the production well.

19. A method as recited in claim 18 wherein the surfactant fluid is injected at a temperature which is at least equal to a value which is 50° F less than the formation temperature in degrees F.

20. A method as recited in claim 18 wherein the first surfactant is an alkylarylpolyethoxyalkyl sulfonate.

21. A method as recited in claim 18 wherein the first surfactant is an alkylarylpolyethoxyethyl sulfonate.

22. A method as recited in claim 18 wherein the first surfactant is an alkylarylpolyethoxyhydroxypropyl sulfonate.

23. A method as recited in claim 18 wherein the first surfactant is an alkylarylpolyethoxypropyl sulfonate.

24. A method as recited in claim 18 wherein the first surfactant is an alkylarylpolyethoxybutyl sulfonate.

25. A method as recited in claim 18 wherein the first surfactant is an alkylpolyalkoxyalkyl sulfonate.

26. A method as recited in claim 25 wherein the surfactant is an alkylpolyethoxyethyl sulfonate.

27. A method as recited in claim 25 wherein the surfactant is an alkylpolyethoxypropyl sulfonate.

28. A method as recited in claim 25 wherein the surfactant is an alkylpolyethoxyhydroxypropyl sulfonate.

29. A method as recited in claim 25 wherein the surfactant is an alkylpolyethoxybutyl sulfonate.

30. A method as recited in claim 18 wherein the surfactant fluid also contains an organic sulfonate.

31. A method as recited in claim 30 wherein the organic sulfonate is petroleum sulfonate.

32. A method as recited in claim 31 wherein the surfactant fluid also contains a water insoluble nonionic surfactant selected from the group consisting of polyethoxylated aliphatic alcohols and polyethoxylated alkyl phenols 33. A method for recovering petroleum from a subterranean, permeable, petroleum-containing formation penetrated by at least one injection well and by at least one production well, both wells being in fluid communication with the formation, said formation temperature being at least 100° F greater than surface ambient temperature, said petroleum formation also containing water whose salinity is from about 70,000 parts per million to about 220,000 parts per million total dissolved solids, comprising:

(a) injecting an aqueous, saline surfactant fluid into the formation via the injection well, said fluid containing a surfactant having the following formula:

$$RO(R'O)_nR''SO_3^-M^+$$

in which R is an alkyl or alkylaryl radical having from 8 to 24 carbon atoms, R' is ethyl or a mixture of ethyl and propyl with relatively more ethyl than propyl, R'' is ethyl, propyl, hydroxypropyl or butyl, $n$ is a number from 1 to 20, and $M^+$ is a monovalent cation, the number of carbon atoms in the alkyl chain and the value of $n$ being balanced so the fluid achieves the minimum interfacial tension at a temperature about equal to the formation temperature in an aqueous fluid whose salinity is about equal to the salinity of the formation water, which surfactant is insoluble at surface ambient temperature, said surfactant fluid being injected at a temperature in degrees F which is at least equal to a value which is 50° less than the formation temperature in degrees F, said surfactant fluid displacing petroleum through the formation toward the production well; and (b) recovering petroleum from the formation via the production well.

34. A method as recited in claim 33 wherein the surfactant fluid also contains an organic sulfonate.

35. A method as recited in claim 34 wherein the organic sulfonate is petroleum sulfonate.

* * * * *